United States Patent
Lin (10) Patent No.: US 12,185,304 B2
(45) Date of Patent: Dec. 31, 2024

(54) METHOD OF INTERLACED PUCCH DESIGN—FORMAT 0

(71) Applicant: OROPE FRANCE SARL, Neuilly sur Seine (FR)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 432 days.

(21) Appl. No.: 17/710,569

(22) Filed: Mar. 31, 2022

(65) Prior Publication Data
US 2022/0264605 A1 Aug. 18, 2022

Related U.S. Application Data (63) Continuation of application No. PCT/IB2019/001275, filed on Oct. 5, 2019.

(51) Int. Cl.
*H04W 72/12* (2023.01)
*H04L 5/00* (2006.01)
(Continued)

(52) U.S. Cl.
CPC ....... *H04W 72/1268* (2013.01); *H04L 5/0053* (2013.01); *H04L 27/2607* (2013.01); *H04W 72/20* (2023.01)

(58) Field of Classification Search
CPC ..... H04W 72/12; H04W 72/20; H04W 72/21; H04W 72/04; H04W 72/23; H04W 76/28;
(Continued)

(56) References Cited

U.S. PATENT DOCUMENTS

| 8,660,076 B2 * | 2/2014 | Park | H04W 72/20 370/329 |
| 10,390,314 B2 * | 8/2019 | Seo | H04W 52/146 |

(Continued)

FOREIGN PATENT DOCUMENTS

| CN | 101978644 A | 2/2011 |
| CN | 104901775 A | 9/2015 |

(Continued)

OTHER PUBLICATIONS

Qualcomm ("UL signals and channels for NR-U", R1-1909244, 3GPP TSG RAN WG1 Meeting #98, Aug. 30, 2019), Section 3.11, 3.1.2,3.2. Year 2019 (Year: 2019).*
(Continued)

*Primary Examiner* — Man U Phan
(74) *Attorney, Agent, or Firm* — Ladas & Parry LLP (57) ABSTRACT

The disclosure is related to a method of transmitting a physical uplink control channel (PUCCH) in unlicensed spectrum, which is transmitted by a user equipment, the method comprising:
generating a PUCCH format 0 in an interlaced structure, based on a base sequence (BSEQ), an acknowledgement information (A/N), and a cyclic shift group (CSG) containing a number of cyclic shift members (CSM) corresponding to the resource block number within the interlaced structure;
determining the cyclic shift group (CSG) containing a first cyclic shift member (CSM) and a plurality of subsequent cyclic shift members (CSMn):
defining a one-to-one mapping relationship between CSG and an acknowledgement information (A/N);
transmitting the generated PUCCH using format 0.

18 Claims, 6 Drawing Sheets

(51) Int. Cl.
  *H04L 27/26* (2006.01)
  *H04W 72/1268* (2023.01)
  *H04W 72/20* (2023.01)

(58) Field of Classification Search
  CPC ..... H04W 76/38; H04W 16/14; H04W 28/06; H04L 27/26; H04L 5/00; H04L 1/00; H04L 1/18; H04L 1/16; H04L 27/00; H04J 13/22
  USPC .......................................................... 370/329
  See application file for complete search history.

(56) References Cited

U.S. PATENT DOCUMENTS

| | | | | |
|---|---|---|---|---|
| 10,750,484 | B2* | 8/2020 | Zhang | H04W 72/21 |
| 11,515,970 | B2* | 11/2022 | Huang | H04L 1/1819 |
| 11,576,160 | B2* | 2/2023 | Zhang | H04L 5/0053 |
| 11,595,181 | B2* | 2/2023 | Choi | H04W 72/12 |
| 11,700,607 | B2* | 7/2023 | Matsumura | H04W 72/02 370/329 |
| 11,805,510 | B2* | 10/2023 | Kuo | H04W 72/1263 |
| 11,943,773 | B2* | 3/2024 | Falahati | H04W 72/21 |
| 11,974,136 | B2* | 4/2024 | Bhattad | H04L 27/2636 |
| 11,979,873 | B2* | 5/2024 | Yin | H04W 72/1268 |
| 2022/0232595 | A1* | 7/2022 | Lin | H04L 1/1861 |
| 2023/0328736 | A1* | 10/2023 | Choi | H04L 25/03343 370/330 |

FOREIGN PATENT DOCUMENTS

| | | |
|---|---|---|
| CN | 108604967 A | 9/2018 |
| CN | 109155710 A | 1/2019 |
| CN | 109802811 A | 5/2019 |
| WO | 2019031954 A1 | 2/2019 |
| WO | 2019160364 A1 | 8/2019 |

OTHER PUBLICATIONS

International Search Report (ISR) dated Jun. 17, 2020 for Application No. PCT/IB2019/001275.
Qualcomm Incorporated:'UL signals and channels for NR-U' 3GPP TSG RAN WG1 Meeting #98 R1-1909244 Aug. 17, 2019.
Vivo:'Discussion on physical UL channel design in unlicensed spectrum' 3GPP TSG RAN WG1 #98bis R1-1910203 Oct. 4, 2019.
The first Office Action of corresponding Chinese application No. 202210604192.1, dated Sep. 14, 2023.
Nokia, Nokia Shanghai Bell:"Remaining details of short PUCCH for UCI up to 2 bits", R1-1718304, 3GPP TSG RAN WG1 Meeting 90bis, Prague, Czech, Oct. 9-13, 2017.
The NOA of corresponding Chinese application No. 202210604192. 1, dated Mar. 7, 2024.
LG Electronics; Physical cell ID allocation to the aggregated component carriers, R1-092499, 3GPP TSG RAN WG1 #57bis Los Angeles, CA, USA; Jun. 29-Jul. 3, 2009.

* cited by examiner

Fig. 1

| position i | 0 | 1 | 2 | 3 | 4 | 5 | 6 | 7 | 8 | 9 |
|---|---|---|---|---|---|---|---|---|---|---|
| CSM of ith position | $m_{cs}^0$ | $m_{cs}^1$ | $m_{cs}^2$ | $m_{cs}^3$ | $m_{cs}^4$ | $m_{cs}^5$ | $m_{cs}^6$ | $m_{cs}^7$ | $m_{cs}^8$ | $m_{cs}^9$ |

Fig. 2

| position i | 0 | 1 | 2 | 3 | 4 | 5 | 6 | 7 | 8 | 9 |
|---|---|---|---|---|---|---|---|---|---|---|
| CSM of ith position | $m_{cs}^0=0$ | $m_{cs}^1=1$ | $m_{cs}^2=2$ | $m_{cs}^3=3$ | $m_{cs}^4=4$ | $m_{cs}^5=5$ | $m_{cs}^6=6$ | $m_{cs}^7=7$ | $m_{cs}^8=8$ | $m_{cs}^9=9$ |

Fig. 3

| position i | 0 | 1 | 2 | 3 | 4 | 5 | 6 | 7 | 8 | 9 |
|---|---|---|---|---|---|---|---|---|---|---|
| CSM of ith position | $m_{cs}^0=5$ | $m_{cs}^1=6$ | $m_{cs}^2=7$ | $m_{cs}^3=8$ | $m_{cs}^4=9$ | $m_{cs}^5=0$ | $m_{cs}^6=1$ | $m_{cs}^7=2$ | $m_{cs}^8=3$ | $m_{cs}^9=4$ |

Fig. 4

| A/N | 0 | 1 |
|---|---|---|
| CSM value | $m_{cs}^{ref}=0$ | $m_{cs}^{ref}=6$ |

Fig. 5A

| A/N | 0, 0 | 0, 1 | 1, 1 | 1, 0 |
|---|---|---|---|---|
| CSM value | $m_{cs}^{ref}=0$ | $m_{cs}^{ref}=3$ | $m_{cs}^{ref}=6$ | $m_{cs}^{ref}=9$ |

Fig. 5B

| 0 | 1 | 2 | 3 | 4 | 5 | 6 | 7 | 8 | 9 | position i |
|---|---|---|---|---|---|---|---|---|---|---|
| $m_{cs}^0=7$ | $m_{cs}^1=8$ | $m_{cs}^2=9$ | $m_{cs}^3=10$ | $m_{cs}^4=11$ | $m_{cs}^5=2$ | $m_{cs}^6=3$ | $m_{cs}^7=4$ | $m_{cs}^8=5$ | $m_{cs}^9=6$ | CSM of ith position |

Fig. 6A

| 0 | 1 | 2 | 3 | 4 | 5 | 6 | 7 | 8 | 9 | position i |
|---|---|---|---|---|---|---|---|---|---|---|
| $m_{cs}^0=1$ | $m_{cs}^1=2$ | $m_{cs}^2=3$ | $m_{cs}^3=4$ | $m_{cs}^4=5$ | $m_{cs}^5=8$ | $m_{cs}^6=9$ | $m_{cs}^7=10$ | $m_{cs}^8=11$ | $m_{cs}^9=0$ | CSM of ith position |

Fig. 6B

| A/N | 0 | 1 |
|---|---|---|
| CSM value | $m_{cs}^{ref}=0$ | $m_{cs}^{ref}=6$ |

| | positive SR | negative SR |
|---|---|---|

| | positive SR | negative SR |
|---|---|---|
| A/N | 0 \| 1 | 0 \| 1 |
| CSM value | $m_{cs}^{ref}=0$ \| $m_{cs}^{ref}=6$ | $m_{cs}^{ref}=3$ \| $m_{cs}^{ref}=9$ |

Fig. 7A

| | Positive SR | | | | negative SR | | | |
|---|---|---|---|---|---|---|---|---|
| A/N | 0,0 | 0,1 | 1,1 | 1,0 | 0,0 | 0,1 | 1,1 | 1,0 |
| CSM value | $m_{cs}^{ref}=0$ | $m_{cs}^{ref}=3$ | $m_{cs}^{ref}=6$ | $m_{cs}^{ref}=9$ | $m_{cs}^{ref}=1$ | $m_{cs}^{ref}=4$ | $m_{cs}^{ref}=7$ | $m_{cs}^{ref}=10$ |

Fig. 7B

| A/I | 0 | 1 |
|---|---|---|
| CSI value | $m_{cs}^{ref}=0, p^{ref}=0$ | $m_{cs}^{ref}=0, p^{ref}=5$ |

Fig. 8

METHOD OF INTERLACED PUCCH DESIGN—FORMAT 0

CROSS-REFERENCE TO RELATED APPLICATIONS

This application is a continuation of International Application No. PCT/IB2019/001275, filed on Oct. 5, 2019, which is hereby incorporated by reference in its entirety.

TECHNICAL FIELD

The present disclosure relates to the field of communication technologies in unlicensed spectrum, and in particular, to a method for a user equipment to transmit a physical uplink control channel in a wireless communication system supporting an unlicensed band and apparatuses supporting the same.

The communication technology is for example a 5G (fifth generation) network using the 5G NR (New Radio) as radio access technology (RAT) defined by 3GPP. The present disclosure is applicable to 5G NR-U (NR in unlicensed spectrum).

BACKGROUND

According to the NR specification Release 15 (NR R15, 3GPP TS 38.213), the UE reports uplink control information (UCI) in a physical uplink control channel (PUCCH).

PUCCH Format 0

In NR Rel. 15, the PUCCH format 0 is generated from a specified computer generated sequence (CGS) of length 12, i.e., $S(n), n=0, \ldots, 11$, which possesses very low Peak-to-Average Power Ratio (PAPR) property. This channel can carrier 1 or 2-bits ACK/NACK (A/N) information together with Scheduling Request (SR) indication. The A/N information is presented by the cyclic shift (CS), additionally introduced on top of the CGS. There are 12 possible CS, i.e. $m_{cs}=0, \ldots, 11$. The cyclic shifted sequence is given by $$S_{cs}(n) = e^{\frac{j\pi}{6}\alpha n} \cdot S(n), n = 0, \ldots, 11,$$

where $\alpha$ is a phase rotation depending on the selected CS $m_{cs}$. The A/N information is tightly bounded with the $m_{cs}$ value, which is specified in NR Rel. 15, TS 38.213 section 9.2.3 and section 9.2.5.1. The PUCCH format 0 occupies 1 Physical Resource Block (PRB) in frequency (12 subcarriers) and 1 or 2 orthogonal frequency-division multiplexing (OFDM) symbols in time domain.

NR-U PUCCH Interlace

Figure 1:
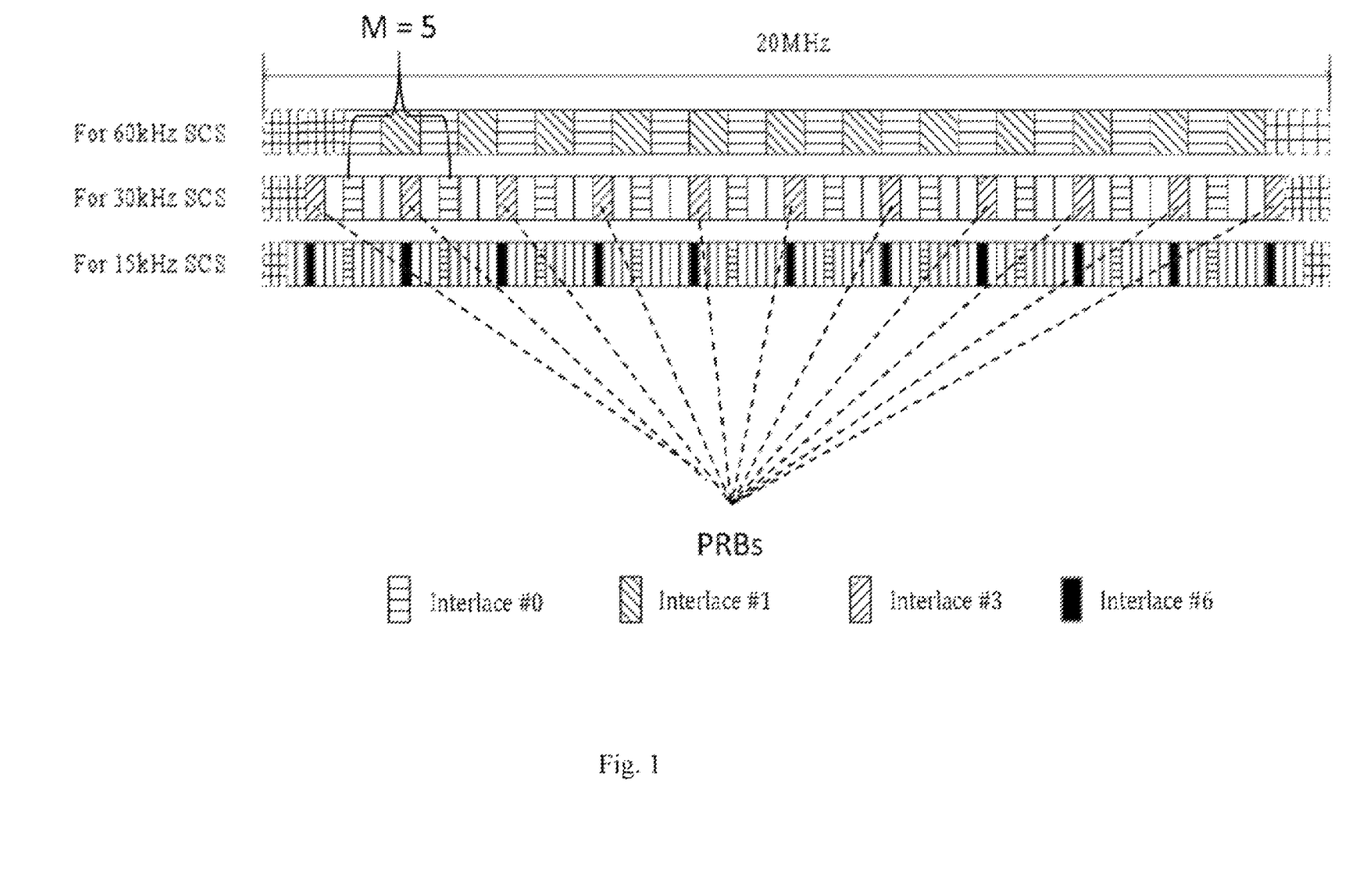
FIG. 1 shows an example of an interlaced structure for PUCCH.

In the unlicensed band in 5G Hz, the regulation imposes that if a transmitter wants to operate transmission in the channel, the transmission has to occupy at least 80% of the channel bandwidth. With this restriction in mind, NR-U decided to adopt an interlaced structure for two uplink channel transmissions, they are PUCCH and PUSCH. Each interlace structure will have specific number of PRB. Between each consecutive PRB pairs, there is M PRB further apart. For example, in a 20 Mhz bandwidth and for 30 Khz subcarrier spacing case, 1 interlace has 10 or 11 PRBs and M=5 as shown in FIG. 1.

The NR Rel. 15 PUCCH format 0 occupies only 1 PRB in frequency domain, while in NR-U the interlaced structure has to be implemented. A simple repetition of NR Rel. 15 PUCCH format 0 in each of the PRBs of an interlace will cause very high PAPR issue. Thus, an enhancement should be done for this new design of PUCCH format 0 in NR-U systems.

SUMMARY

A first object of the present disclosure is a method of transmitting a physical uplink control channel (PUCCH) in unlicensed spectrum, which is transmitted by a user equipment, the method comprising:
  generating a PUCCH format 0 in an interlaced structure, based on a base sequence (BSEQ), an acknowledgement information (A/N), and a cyclic shift group (CSG) containing a number of cyclic shift members (CSM) corresponding to the resource block number within the interlaced structure;
  determining the cyclic shift group (CSG) containing a first cyclic shift member (CSMf) and a plurality of subsequent cyclic shift members (CSMn), each cyclic shift member (CSM) being defined by a value and a position, by:
    configuring the first cyclic shift member (CSMf) with a first indication related to the CSMf value and a second indication related to the CSMf position;
    deriving the plurality of subsequent cyclic shift members (CSMn) based on the CSMf value and on the relative position between CSMf and each CSMn so as to define all CSM which are mutually different;
  defining a one-to-one mapping relationship between the CSG and an acknowledgement information (A/N);
  transmitting the generated PUCCH using format 0.

Such method allows to generate and transmit a PUCCH format 0 in the interlaced structure that is able to carrier 1-bit, 2-bit A/N. Moreover this method allows to maintain a low PAPR property. The PAPR reduction is due to the cyclic shift group under the condition that the cyclic shift members are mutually different. The relationship between the different cyclic shift members ensures this condition. The first and second indications may be assigned to different user equipments (UE) in order to enable UE multiplexing in the same resource, i.e. different UEs will be assigned to different first cyclic shift member, and/or different first cyclic shift member position. The one-to-one mapping definition is done so that for the same UE with the same first and second indications, different A/N statuses will relate to different CSG and for different UEs with different indications, each A/N status will relate to different CSG.

Advantageously, the PUCCH using format 0 generation comprises the acknowledgement information (A/N) together with a Scheduling Request (SR) indication and the one-to-one mapping relationship definition is done between the CSG and the A/N information together with the SR indication.

Such method allows to design a PUCCH format 0 including the SR indication which can be used to obtain mutually different CSM. Further, the one-to-one mapping definition will be extended to SR so that for the same UE with the same indications, different A/N+SR statuses will relate to different CSG and for different UEs with different indications, each A/N+SR status will relate to different CSG.

Advantageously, the first indication is either a direct indication of the CSMf value from a set of CSM candidates or an indirect indication by a first offset with respect to a reference value of the CSMf in a set of ordered CSM candidates. More preferably, in case of an indirect indication, the reference value of the CSMf is either pre-defined or configured via a radio resource control (RRC) or derived by a first function. Advantageously, a default CSMf value is set in the absence of a first indication.

Such first indication (direct, indirect or by default) allows to determine the value of CSMf and derive the subsequent values of CSMn.

Advantageously, the second indication is either a direct indication of the CSMf position in the CSG from a set of position candidates or an indirect indication by a second offset with respect to a reference position of the CSMf in a set of ordered position candidates. More preferably, in case of an indirect indication, the reference position of the CSMf is either pre-defined or configured via a radio resource control (RRC) or derived by a second function. Advantageously, a default CSMf position is set in the absence of a second indication.

Such second indication (direct, indirect or by default) allows to determine the position of CSMf and derive the subsequent position of CSMn.

Advantageously, subsequent CSMn values are derived using a third function including at least one parameter T determined by a third indication. More preferably, the third indication is either a direct indication of the parameter value from a set of parameter value candidates or a default value in the absence of the third indication.

The first, second and third indications may be assigned to different UEs in order to enable UE multiplexing in the same resource, i.e. different UEs will be assigned to different first cyclic shift member, and/or different first cyclic shift member position, and/or different T. The one-to-one mapping definition will be extended so that for the same UE with the same first, second and third indications, different A/N or A/N+SR statuses will relate to different CSG and for different UEs with different indications, each A/N or A/N+SR status will relate to different CSG.

A second object of the present disclosure is a user equipment transmitting a physical uplink control channel to a base station in a wireless communication system in unlicensed spectrum, the user equipment comprising:
a processor configured to:
generate a PUCCH format 0 in an interlaced structure, based on a base sequence (BSEQ), an acknowledgement information (A/N), and a cyclic shift group (CSG) containing a number of cyclic shift members (CSM) corresponding to the resource block number within the interlaced structure;
determine a cyclic shift group (CSG) containing a first cyclic shift member (CSMf) and a plurality of subsequent cyclic shift members (CSMn), each cyclic shift member (CSM) being defined by a value and a position, by:
configuring the first cyclic shift member (CSMf) with a first indication related to the CSMf value and a second indication related to the CSMf position;
deriving the plurality of subsequent cyclic shift members (CSMn) based on the CSMf value and on the relative position between CSMf and each CSMn so as to define all CSM which are mutually different;
define a one-to-one mapping relationship between CSG and an acknowledgement information (A/N):
and
a transmitter to transmit the generated PUCCH.

Advantageously, the processor is configured to generate the PUCCH using format 0 comprising the acknowledgement information (A/N) together with a Scheduling Request (SR) indication; and to define the one-to-one mapping relationship between the CSG and the A/N information together with the SR indication.

Advantageously, the first indication is either a direct indication of the CSMf value from a set of CSM candidates or an indirect indication by a first offset with respect to a reference value of the CSMf in a set of ordered CSM candidates. More preferably, in case of an indirect indication, the reference value of the CSMf is either pre-defined or configured via a radio resource control (RRC) or derived by a first function. Advantageously, the processor is configured to set a default CSMf value in the absence of a first indication.

Advantageously, the second indication is either a direct indication of the CSMf position in the CSG from a set of position candidates or an indirect indication by a second offset with respect to a reference position of the CSMf in a set of ordered position candidates. More preferably, in case of an indirect indication, the reference position of the CSMf is either pre-defined or configured via a radio resource control (RRC) or derived by a second function. Advantageously, the processor is configured to set a default CSMf position in the absence of a second indication.

Advantageously, the processor is configured to derive subsequent CSMn values using a third function including at least one parameter determined by a third indication. More preferably, the third indication is either a direct indication of the parameter value from a set of parameter value candidates or a default value in the absence of the third indication.

A third object of the present disclosure is a computer readable medium comprising program instructions for causing a user equipment to perform the steps of the transmitting method according to the first aspect.

BRIEF DESCRIPTION OF DRAWINGS

The appended drawings required description of embodiments or the prior art will be briefly described below.

DESCRIPTION OF EMBODIMENTS

In the following disclosure, we will first present a cycle shift group and cycle shift member, followed by examples for implementing to method of generating and transmitting a PUCCH format 0.

Cycle Shift Group and Cycle Shift Members

Figure 2:
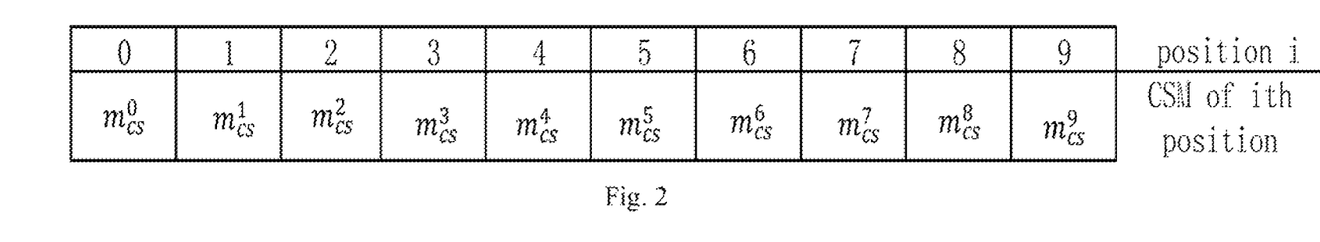
FIG. 2 shows an example of a cyclic shift group (CSG) within 1 interlace.

The cyclic shift group (CSG) can be expressed as $m_{cs}^i$ with $i=0, \ldots, N_{RB}^{interlace}-1$, where $N_{RB}^{interlace}$ stands for the total number of PRB within 1 interlace; $m_{cs}^i$ is a cyclic shift member and its corresponding position is i-th position within the cyclic shift group. Thus a cyclic shift group contains $N_{RB}^{interlace}$ cyclic shift members and accordingly it contains $N_{RB}^{interlace}$ positions. In the example of FIG. 2, we assume $N_{RB}^{interlace}=10$. Therefore, the position i goes from 0 up to 9.

If one cyclic shift member as well as its position are determined (i.e. $m_{cs}^i$), the cyclic shift member on the rest of the positions (i.e. $m_{cs}^j$) can be derived from some pre-defined relationship, such as:

$$m_{cs}^j = (m_{cs}^i + ((j-i) \bmod N_{RB}^{interlace})T) \bmod 12.$$

In this example, all cyclic shift members on j-th position, $m_{cs}^j$, can be derived from $m_{cs}^i$ and the relative position between j and i, and optionally with a parameter T. Here $m_{cs}^i$ is the value of the so-called first cycle shift member (CSMf), to be indicated by a first indication, i is the position of CSMf, to be indicated by a second indication, and T is an optional first parameter to be indicated by a third indication.

Cycle Shift Member Candidates

In the present disclosure, we assume that the cyclic shift member (CSM) can take the value from a set of candidate values, called cyclic shift member candidates. The candidate values are integer values from 0 up to 11, i.e. $\{0,1,2,3,4,5,6,7,8,9,10,11\}$. The reason of this choice is that after the cyclic shift group is decided, the PUCCH format 0 is formed as $$S_{cs}^i(n) = e^{\frac{j\pi}{6}\alpha n} \cdot S(n), n = 0, \ldots, 11; i = 0, \ldots, N_{RB}^{interlace} - 1,$$

where $\alpha(i)$ is i-th phase rotation that is a function of the i-th cyclic shift member $m_{cs}^i$. In the following we simply write it as $$S_{cs}^i(n) = e^{\frac{j\pi}{6}m_{cs}^i n} \cdot S(n).$$

Note that S(n) is a base sequence for PUCCH format 0.

Examples of Determination of the Cycle Shift Group

Figure 3:
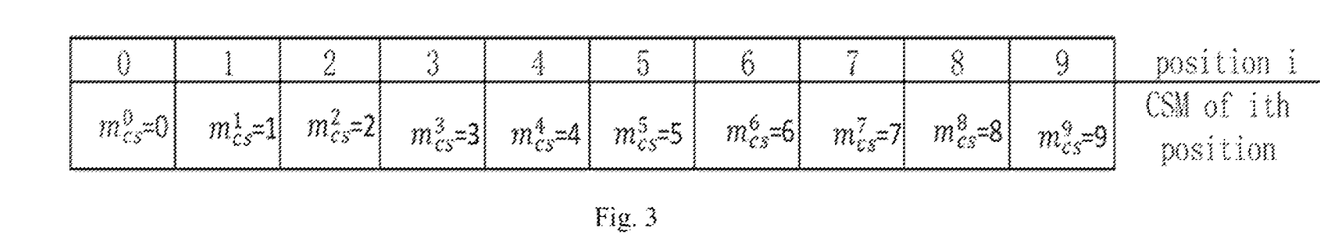
FIG. 3 shows another example of a cyclic shift group (CSG) within 1 interlace.

For example, if we assume that $N_{RB}^{interlace}=10$, and T=1, when one cyclic shift member (CSM) value and its corresponding position is given, for example $m_{cs}^0=0$, then we can derive $m_{cs}^j=(0+j \bmod 10) \bmod 12=\{1,2,3,4,5,6,7,8,9\}$ for $j=\{1,2,3,4,5,6,7,8,9\}$, respectively. Thus, the cyclic shift group CSG is $m_{cs}^i=i$, for $i=\{0,1,2,3,4,5,6,7,8,9\}$ as shown in FIG. 3.

In this example, the first cyclic shift member CSMf (a.k.a. $m_{cs}$), for which the cyclic shift member value is indicated by the first indication and its position is indicated by the second indication, i.e. $m_{cs}^0=0$. The rest of the cyclic shift members (CSMn) in the group can be derived from a pre-defined relationship, which is $m_{cs}^j=(m_{cs}^0+((j-0) \bmod 10)T) \bmod 12$. Then the third indication will give the value of the parameter T, i.e. T=1 in our example.

Figure 4:
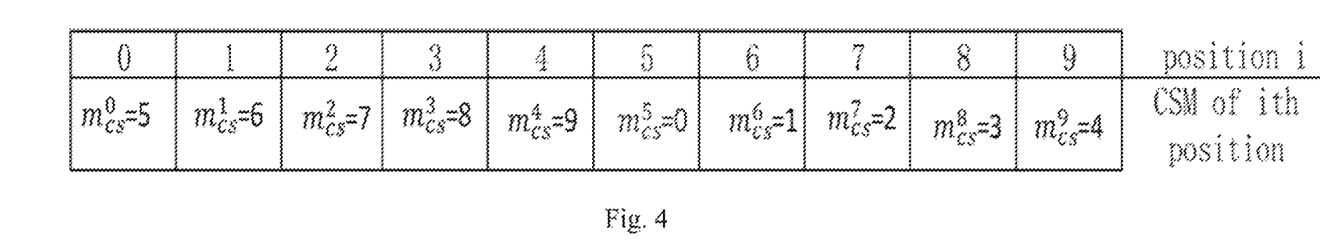
FIG. 4 shows another example of a cyclic shift group (CSG) within 1 interlace.

Another example, if we set one cyclic shift member and its corresponding position to $m_{cs}^5=0$, then we can derive $m_{cs}^j=(0+(j-5) \bmod 10) \bmod 12=\{5,6,7,8,9,1,2,3,4\}$ for $j=\{0,1,2,3,4,5,6,7,8,9\}$, respectively. Thus, the cyclic shift group is $\{5,6,7,8,9,0,1,2,3,4\}$ as shown in FIG. 4.

In this example, the first cyclic shift member CSMf (a.k.a. $m_{cs}$), for which the cyclic shift member value is indicated by the first indication and its position is indicated by the second indication, i.e. $m_{cs}^5=0$. The rest of the cyclic shift members in the group can be derived from a pre-defined relationship, which is $m_{cs}^j=(m_{cs}^5+((j-5) \bmod 10)T) \bmod 12$. Then the third indication will give the value of the parameter T, i.e. T=1 in our example.

Examples of ACK/NACK Only with 1 or 2 Bits

Figure 5A:
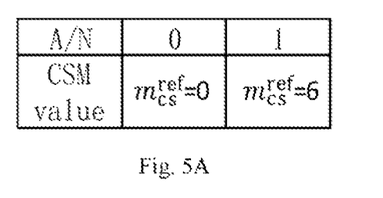
FIG. 5A-5B shows an example of 1-bit and 2-bit ACK/NACK reporting using a determined cyclic shift group (CSG)

The user equipment (UE) reports ACK/NACK (A/N) using the determined cyclic shift group (CSG). In this example, we assume that there is a reference value for the first cyclic shift member CSMf, which can be pre-specified, such as for the case of 1-bit A/N, $m_{cs}^{ref}=0$ for ACK ($m_{cs}^{ref}$(Ack)=0) and $m_{cs}^{ref}=6$ ($m_{cs}^{ref}$(Nack)=6) for NACK as shown in FIG. 5A. Thus in this example, when a UE has to report 1-bit A/N, if the A/N=ACK, the reference cyclic shift member value is 0, and if the A/N=NACK, the reference cyclic shift member value is 6.

Figure 5B:
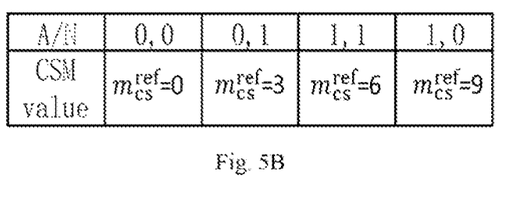

For the case of 2-bits A/N, four reference values are pre-defined:

ACK: $m_{cs}^{ref}=0$ for [0,0] and $m_{cs}^{ref}=3$ for [0,1],

NACK: $m_{cs}^{ref}=6$ for [1,1] and $m_{cs}^{ref}=9$ for [1,0], as shown in FIG. 5B.

Thus in this example, when a UE has to report 2-bit A/N, if
the A/N=[0,0] ACK, the reference cyclic shift member value is 0,
the A/N=[0,1] ACK, the reference cyclic shift member value is 3,
the A/N=[1,1] NACK, the reference cyclic shift member value is 6, and
the A/N=[1,0] NACK, the reference cyclic shift member value is 9.

Alternatively, it can be defined that each even slot is for ACK and each odd slot is for NACK.

Coming back to the 1-bit A/N example shown in FIG. 5A, the network, e.g. a base station, can send the first and second indications to inform the UE about the first cyclic shift member and its corresponding position. For example, the first indication can be an offset w.r.t. $m_{cs}^{ref}$, e.g. $offset_1=2$; and the second indication can point directly to the position index, such as 5. In this manner, the UE knows that the first cyclic shift member is $m_{cs}^5=m_{cs}^{ref}$(Ack)+$offset_1$=2 for ACK; and $m_{cs}^5=m_{cs}^{ref}$(Nack)+$offset_1$=8 for NACK.

As long as the first cyclic shift member is determined, all the subsequent members can be derived from it when the derivation relationship is determined, which can be optionally depending on the third indication. Assume that the third indication points the parameter T=1, then we have the following derivation relationship:

$$m_{cs}^j=(m_{cs}^5+((j-5) \bmod 10)) \bmod 12.$$

Figure 6A:
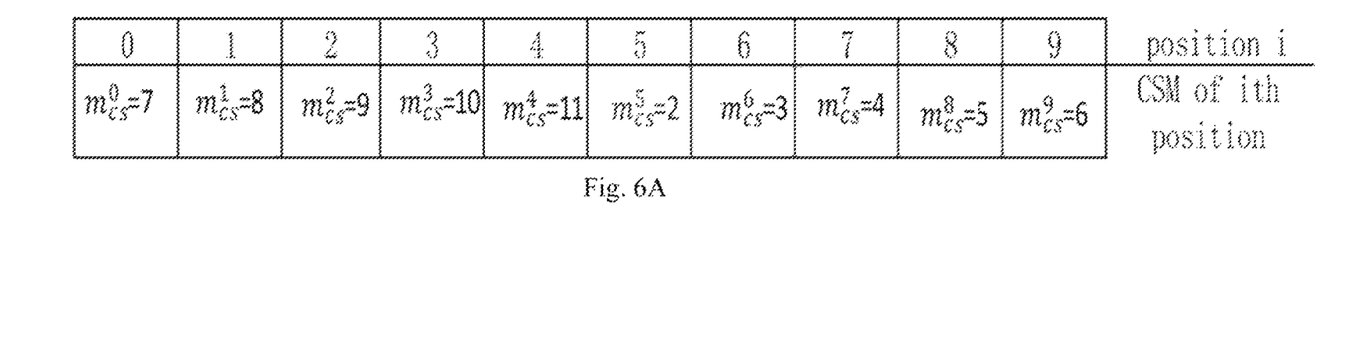
FIG. 6A-6B shows an example of ACK and NACK reporting using a determined CSG.
Figure 6B:
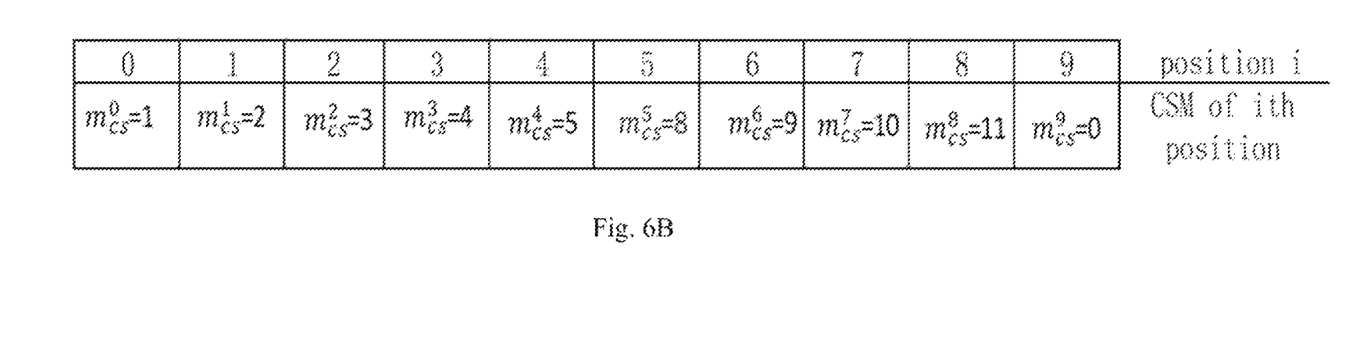

As a result the cycle shift group determined for ACK is given in FIG. 6A and the cycle shift group determined for NACK is given in FIG. 6B.

It is worth noting that the second and the third indications can also indicate an offset w.r.t. a pre-defined reference. For instance, for the second indication, the network can define a reference position, e.g., $p^{ref}=0$, then the indication gives an offset$_2$. Thus, the UE will understand that the indicated position is p=p$^{ref}$+offset$_2$, where offset$_2$={0,1,2,3,4,5,6,7,8,9}.

Similarly, the third indication can also give an offset within a set of candidate values w.r.t. a pre-defined value, e.g. T=A(t$^{ref}$+offset$_3$). Assuming the candidate values are {1,3,5,7,11} and t$^{ref}$=0. Then the third indication can indicate: offset$_3$={0,1,2,3,4}. Either ways, i.e. direct indication or indirect indication via reference and offsets, will lead to the same cyclic shrift group for A/N reporting.

Examples of ACK/NACK Together with Scheduling Request (SR)

In a more complex example, the UE has to report A/N together with positive SR or negative SR. Similar to the example with A/N only, the reference cyclic shift member value can be used to reflect different combinations of A/N+SR. An example for 1-bit A/N+SR case is shown in FIG. 7A and another example for 2-bit A/N+SR is shown in FIG. 7B.

Figure 7A:
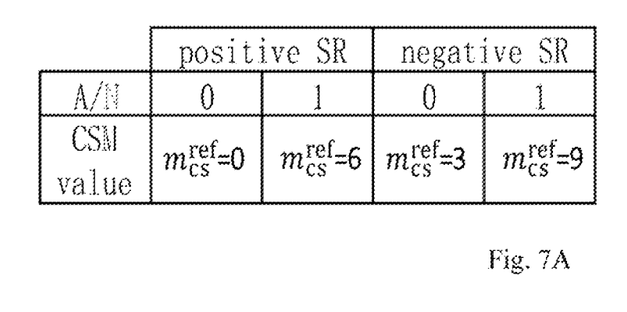
FIG. 7A-7B shows an example of 1-bit and 2-bit ACK/NACK with Scheduling Request (SR) reporting using a determined CSG.

Thus in FIG. 7A, for the case of 1-bit A/N+SR, four reference values are pre-defined:
ACK and positive SR: m$_{cs}^{ref}$=0,
ACK and negative SR: m$_{cs}^{ref}$=3,
NACK and positive SR: m$_{cs}^{ref}$=6,
NACK and negative SR: m$_{cs}^{ref}$=9.

Figure 7B:
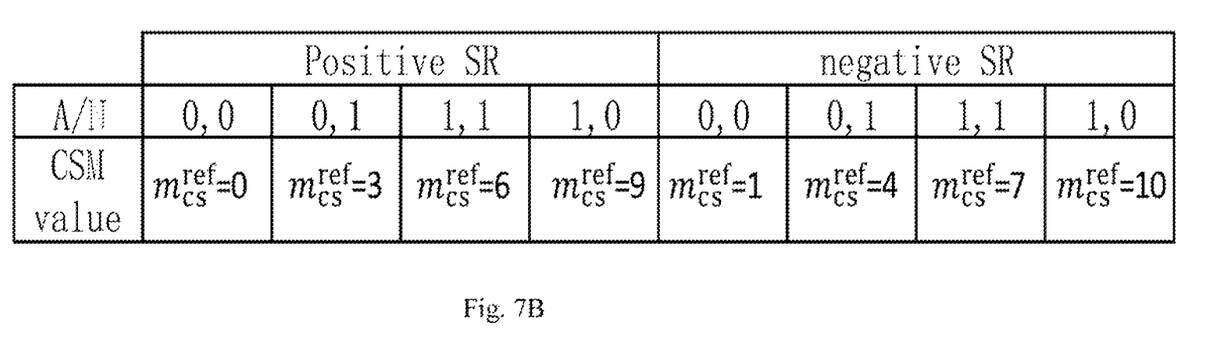

In FIG. 7B, for the case of 1-bit A/N+SR, eight reference values are pre-defined:
ACK and positive SR: m$_{cs}^{ref}$=0 for [0,0] and m$_{cs}^{ref}$=3 for [0,1],
ACK and negative SR: m$_{cs}^{ref}$=1 for [0,0] and m$_{cs}^{ref}$=4 for [0,1],
NACK and positive SR: m$_{cs}^{ref}$=6 for [1,1] and m$_{cs}^{ref}$=9 for [1,0],
NACK and negative SR: m$_{cs}^{ref}$=7 for [1,1] and m$_{cs}^{ref}$=10 for [1,0].

Then the rest of the process is similar to the ACK/NACK only with 1 or 2 bits.

Example of Reference to A/N Mapping and UE Multiplexing

In the above examples, the reference cyclic shift member, m$_{cs}^{ref}$, represents the A/N or A/N+SR results, while the first, second and third indications are assigned to different UEs in order to enable UE multiplexing in the same resource, i.e. different UEs will be assigned to different first cyclic shift member, and/or different first cyclic shift member position, and/or different T.

Figure 8:
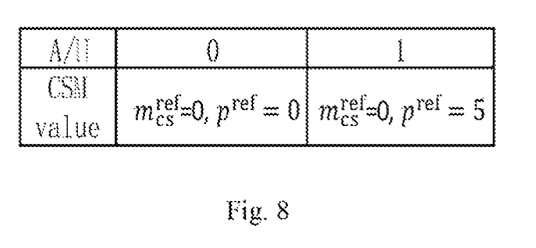
FIG. 8 shows another example of 1-bit ACK/NACK reporting using a determined CSG with several references.

It is worth noting that other options are possible, such that selecting m$_{cs}^{ref}$+p$^{ref}$ to represent A/N or A/N+SR. An example for 1-bit A/N is shown in FIG. 8. It is to say that we have three different references, i.e. m$_{cs}^{ref}$, p$^{ref}$, t$^{ref}$, so normally any reference or any combination of multiple references can be used to represent A/N or A/N+SR.

List of abbreviations in the description and drawings:

| Acronyms | Full name |
| --- | --- |
| LIE | Long Term Evolution |
| LTE-A | Advanced long term evolution |
| NR | New Radio |
| NR-U | New Radio-unlicensed |
| BS | Base-station |
| UE | User Equipment |
| PUCCH | Physical Uplink Control CHannel |
| PUSCH | Physical Uplink Shared CHannel |

-continued

| Acronyms | Full name |
| --- | --- |
| UCI | Uplink control information |
| LBT | Listen Before Talk |
| SR | Scheduling Request |
| CSM | Cyclic Shift Member |
| CSMf | first Cyclic Shift Member |
| CSMn | subsequent Cyclic Shift Member |
| CSG | Cyclic Shift Group |
| A/N | ACK/NACK (Acknowledgement/Non-Acknowledgement) |

In the above description, the mobile telecommunication system is a 5G mobile network comprising a 5G NR access network, The present example embodiment is applicable to NR in unlicensed spectrum (NR-U). The present disclosure can be applied to other mobile networks, in particular to mobile network of any further generation cellular network technology (6G, etc.).

The above is only a specific implementation manner of the present disclosure, the protection scope of the present disclosure is not limited thereto, and changes or substitutions that can easily be thought of by those skilled in the art within the technical scope disclosed in the present disclosure should be covered by the protection scope of the present disclosure. Therefore, the protection scope of the present disclosure should be subject to the protection scope of the claims.

The various embodiments/examples, aspects and features, if any, described in this specification that do not fall under the scope of the independent claims are to be interpreted as examples useful for understanding various embodiments of the disclosure.

What is claimed is:

1. A method of transmitting a physical uplink control channel (PUCCH) in unlicensed spectrum, which is transmitted by a user equipment, the method comprising:
   generating a PUCCH format 0 in an interlaced structure, based on a base sequence (BSEQ), an acknowledgement information (A/N), and a cyclic shift group (CSG) containing a number of cyclic shift members (CSM) corresponding to the resource block number within the interlaced structure;
   determining the cyclic shift group (CSG) containing a first cyclic shift member (CSMf) and a plurality of subsequent cyclic shift members (CSMn), each cyclic shift member (CSM) being defined by a value and a position, by:
      configuring the first cyclic shift member (CSMf) with a first indication related to a CSMf value and a second indication related to a CSMf position;
      deriving the plurality of subsequent cyclic shift members (CSMn) based on the CSMf value and on a relative position between CSMf and each CSMn so as to define all CSM which are mutually different,
      defining a one-to-one mapping relationship between the CSG and an acknowledgement information (A/N);
      transmitting the generated PUCCH format 0;
   wherein the PUCCH format 0 generation comprises the acknowledgement information (A/N) together with a scheduling request (SR) indication and the one-to-one mapping relationship definition is done between the CSG and the A/N information together with the SR indication.

2. The method of transmitting a physical uplink control channel (PUCCH) according to claim 1, wherein the first indication is either a direct indication of the CSMf value from a set of CSM candidates or an indirect indication by a first offset with respect to a reference value of the CSMf in a set of ordered CSM candidates.

3. The method of transmitting a physical uplink control channel (PUCCH) according to claim 2, wherein, in case of the indirect indication, the reference value of the CSMf is either pre-defined or configured via a radio resource control (RRC) or derived by a first function.

4. The method of transmitting a physical uplink control channel (PUCCH) according to claim 1, wherein a default CSMf value is set in the absence of the first indication.

5. The method of transmitting a physical uplink control channel (PUCCH) according to claim 1, wherein the second indication is either a direct indication of the CSMf position in the CSG from a set of position candidates or an indirect indication by a second offset with respect to a reference position of the CSMf in a set of ordered position candidates.

6. The method of transmitting a physical uplink control channel (PUCCH) according to claim 1, wherein a default CSMf position is set in the absence of the second indication.

7. The method of transmitting a physical uplink control channel (PUCCH) according to claim 1, wherein the subsequent CSMn values are derived using a third function including a parameter T determined by a third indication.

8. The method of transmitting a physical uplink control channel (PUCCH) according to claim 7, wherein the third indication is either a direct indication of a parameter value from a set of parameter value candidates or a default value in the absence of the third indication.

9. The method of transmitting a physical uplink control channel (PUCCH) according to claim 8, wherein the plurality of subsequent cyclic shift members (CSMn) is derived in a way such that CSMn and the CSMf have the following relationship:

$$m_{cs}^{j}=(m_{cs}^{i}+((j-i)\bmod N_{RB}^{interlace})T)\bmod 12;$$

wherein, i represents the CSMf position, $m_{cs}^{i}$ represents the CSMf value, and $m_{cs}^{j}$ represents a value of CSMn on j-th position.

10. A user equipment for transmitting a physical uplink control channel to a base station in a wireless communication system in unlicensed spectrum, the user equipment comprising:
a processor, configured to;
  generate a PUCCH format 0 in an interlaced structure, based on a base sequence (BSEQ), an acknowledgement information (A/N), and a cyclic shift group (CSG) containing a number of cyclic shift members (CSM) corresponding to the resource block number within the interlaced structure;
  determine the cyclic shift group (CSG) containing a first cyclic shift member (CSMf) and a plurality of subsequent cyclic shift members (CSMn), each cyclic shift member (CSM) being defined by a value and a position, by:
    configuring the first cyclic shift member (CSMf) with a first indication related to a CSMf value and a second indication related to a CSMf position;
    deriving the plurality of subsequent cyclic shift members (CSMn) based on the CSMf value and on a relative position between CSMf and each CSMn so as to define all CSM which are mutually different;
    define a one-to-one mapping relationship between the CSG and an acknowledgement information (A/N);
and
a transmitter, configured to transmit the generated PUCCH format 0;
wherein the processor is further configured to:
  generate the PUCCH format 0 comprising the acknowledgement information (A/N) together with a scheduling request (SR) indication; and
  define the one-to-one mapping relationship between the CSG and the A/N information together with the SR indication.

11. The user equipment according to claim 10, wherein the first indication is either a direct indication of the CSMf value from a set of CSM candidates or an indirect indication by a first offset with respect to a reference value of the CSMf in a set of ordered CSM candidates.

12. The user equipment according to claim 11, wherein, in case of the indirect indication, the reference value of the CSMf is either pre-defined or configured via a radio resource control (RRC) or derived by a first function.

13. The user equipment according to claim 10, wherein the processor is configured to set a default CSMf value in the absence of the first indication.

14. The user equipment according to claim 10, wherein the second indication is either a direct indication of the CSMf position in the CSG from a set of position candidates or an indirect indication by a second offset with respect to a reference position of the CSMf in a set of ordered position candidates.

15. The user equipment according to claim 10, wherein the processor is configured to set a default CSMf position in the absence of the second indication.

16. The user equipment according to claim 10, wherein the processor is configured to derive the subsequent CSMn values using a third function including a parameter T determined by a third indication.

17. The user equipment according to claim 16, wherein the third indication is either a direct indication of a parameter value from a set of parameter value candidates or a default value in the absence of the third indication.

18. A non-transitory computer readable medium comprising program instructions for causing a user equipment to perform the following steps of the transmitting method:
  generating a PUCCH format 0 in an interlaced structure, based on a base sequence (BSEQ), an acknowledgement information (A/N), and a cyclic shift group (CSG) containing a number of cyclic shift members (CSM) corresponding to the resource block number within the interlaced structure;
  determining the cyclic shift group (CSG) containing a first cyclic shift member (CSMf) and a plurality of subsequent cyclic shift members (CSMn), each cyclic shift member (CSM) being defined by a value and a position, by:
    configuring the first cyclic shift member (CSMf) with a first indication related to a CSMf value and a second indication related to a CSMf position;
    deriving the plurality of subsequent cyclic shift members (CSMn) based on the CSMf value and on a relative position between CSMf and each CSMn so as to define all CSM which are mutually different;
    defining a one-to-one mapping relationship between the CSG and an acknowledgement information (A/N);
  transmitting the generated PUCCH format 0;
  wherein the PUCCH format 0 generation comprises the acknowledgement information (A/N) together with a scheduling request (SR) indication and the one-to-one mapping relationship definition is done between the CSG and the A/N information together with the SR indication.

\* \* \* \* \*